US010384821B2

(12) United States Patent
Jung (10) Patent No.: US 10,384,821 B2
(45) Date of Patent: Aug. 20, 2019

(54) STRUCTURE OF HEATER FOR PACKING MACHINE

(71) Applicants: Jong Sun Jung, Hongcheon-Gun (KR); ENTER LINE CO., LTD., Siheung-si, Gyeonggi-Do (KR)

(72) Inventor: Jong Sun Jung, Hongcheon-gun (KR)

(73) Assignees: Jong Sun Jung (KR); ENTER LINE CO., LTD. (KR)

( * ) Notice: Subject to any disclaimer, the term of this patent is extended or adjusted under 35 U.S.C. 154(b) by 907 days.

(21) Appl. No.: 14/433,461

(22) PCT Filed: Oct. 4, 2013

(86) PCT No.: PCT/KR2013/008848
§ 371 (c)(1),
(2) Date: Apr. 3, 2015

(87) PCT Pub. No.: WO2014/054894
PCT Pub. Date: Apr. 10, 2014

(65) Prior Publication Data
US 2015/0203230 A1    Jul. 23, 2015

(30) Foreign Application Priority Data

Oct. 5, 2012 (KR) .......... 10-2012-0110766
Mar. 21, 2013 (KR) .......... 10-2013-0030265

(51) Int. Cl.
*B65B 51/14* (2006.01)
*B29C 65/22* (2006.01)
*B29C 65/00* (2006.01)

(52) U.S. Cl.
CPC ............ *B65B 51/14* (2013.01); *B29C 65/224* (2013.01); *B29C 66/112* (2013.01); *B29C 66/131* (2013.01);
(Continued)

(58) Field of Classification Search
CPC ......... B65B 51/10; B65B 51/14; B65B 31/00; B65B 31/02; B65B 31/06; B65B 7/28;
(Continued)

(56) References Cited

U.S. PATENT DOCUMENTS 2,963,838 A * 12/1960 Harrison ................. B65B 31/06
219/243
3,823,054 A * 7/1974 Balzer et al. ........... B65B 7/164
156/530
(Continued)

FOREIGN PATENT DOCUMENTS

JP    2004026161 A  *  1/2004
KR   1020050017577      2/2005
(Continued)

OTHER PUBLICATIONS

International Search Report—PCT/KR2013/008848 dated Jan. 6, 2014.

*Primary Examiner* — Gloria R Weeks
*Assistant Examiner* — Dariush Seif
(74) *Attorney, Agent, or Firm* — Novick, Kim & Lee, PLLC; Jae Youn Kim (57) ABSTRACT

A structure of a heater for a packing machine which can be mounted on a packing machine such as a food container to thermally seal a wrapping paper such as a film includes: a heating part for generating heat if electric power is applied to the heating part and thermally fusing the wrapping paper to the food container in a hollow closed curve shape; and a connecting part connecting the heating part to a power source, and wherein an upper or lower surface of the heating part contacts the wrapping paper to heat the wrapping paper so that the wrapping paper is thermally fused to the food container.

13 Claims, 11 Drawing Sheets

(52) U.S. Cl.
CPC .. *B29C 66/24221* (2013.01); *B29C 66/24244* (2013.01); *B29C 66/53461* (2013.01); *B29C 66/8324* (2013.01)

(58) Field of Classification Search
CPC ...... B29C 65/224; B29C 66/24221–66/24249; B29C 66/244; H05B 3/03; H05B 2203/016
USPC ........ 53/329.3, 478; 219/240–242, 538–542; 338/322–332
See application file for complete search history.

(56) References Cited

U.S. PATENT DOCUMENTS

| | | | | |
|---|---|---|---|---|
| 4,251,720 A | * | 2/1981 | Bleckmann | H05B 3/04 219/436 |
| 5,239,808 A | * | 8/1993 | Wells | B29C 65/228 53/373.7 |
| 5,791,120 A | * | 8/1998 | De Young | B65B 7/2878 156/308.4 |
| 6,949,727 B2 | * | 9/2005 | Park | H05B 3/04 219/541 |
| 7,667,568 B2 | * | 2/2010 | Tanimura | H01C 1/148 338/307 |
| 8,325,006 B2 | * | 12/2012 | Yoneda | H01C 1/028 338/309 |
| 8,514,052 B2 | * | 8/2013 | Yoneda | H01C 1/014 338/22 R |
| 8,646,244 B2 | * | 2/2014 | Ludwig | B29C 65/18 493/470 |
| 2004/0030305 A1 | * | 2/2004 | Sakamoto | A61F 5/4404 604/317 |
| 2004/0144063 A1 | * | 7/2004 | Countz | B65B 31/024 53/434 |
| 2005/0039420 A1 | * | 2/2005 | Albritton | B65B 31/00 53/432 |
| 2005/0050855 A1 | * | 3/2005 | Baptista | B65B 31/046 53/434 |
| 2006/0090425 A1 | * | 5/2006 | Fenn | B29C 65/18 53/477 |
| 2015/0217925 A1 | * | 8/2015 | Inagaki | B65D 77/2024 426/106 |
| 2015/0259086 A1 | * | 9/2015 | Ahn | B29C 66/24244 53/329.3 |
| 2016/0001907 A1 | * | 1/2016 | Kim | B65B 31/028 53/405 |

FOREIGN PATENT DOCUMENTS

| | | |
|---|---|---|
| KR | 100486640 | 5/2005 |
| KR | 1020050099634 | 10/2005 |
| KR | 1020060011846 | 2/2006 |
| KR | 100842825 | 7/2008 |
| KR | 1020090075582 | 7/2009 |

* cited by examiner

STRUCTURE OF HEATER FOR PACKING MACHINE

TECHNICAL FIELD

The present invention relates to a structure of a heater for a packing machine, and more particularly, to a structure of a heater for a packing machine which can be mounted on a packing machine such as a food container or the like to thermally seal a wrapping paper such as a film.

BACKGROUND ART

In general, in restaurants or large scale department stores, foods are contained in disposable food containers to package foods and are introduced into a packing machine to deliver the foods.

Figure 1:
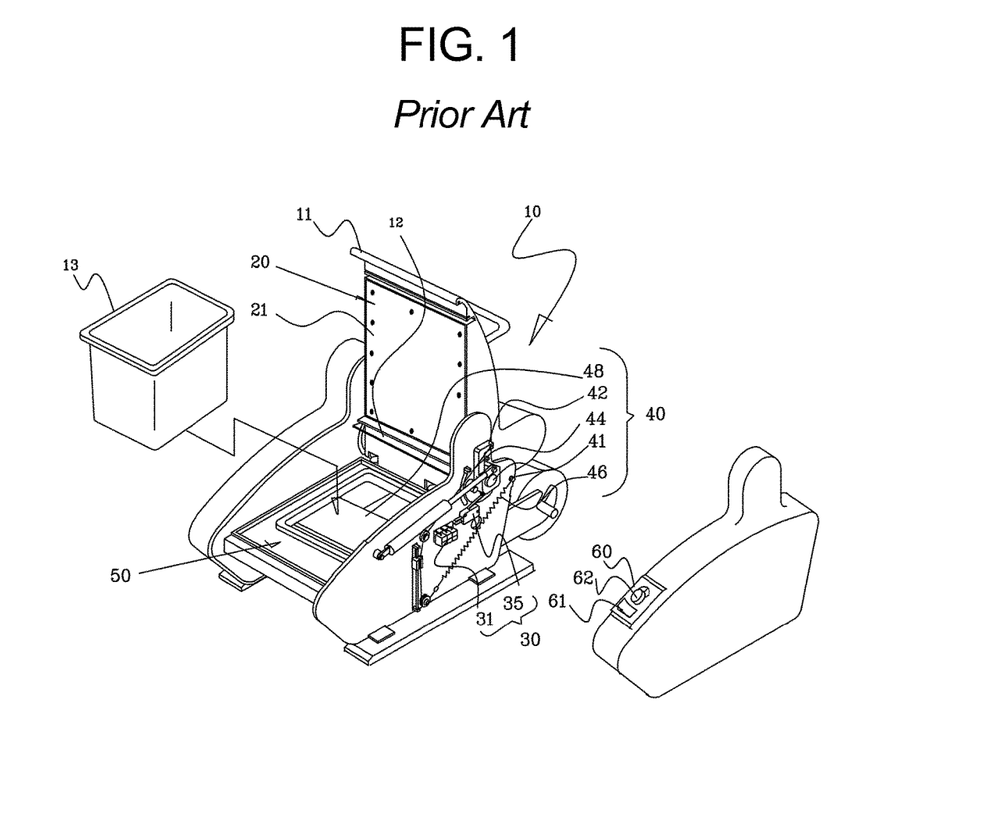
FIG. 1 is a perspective view of a packing machine according to the related art.

FIG. 1 is a perspective view of a packing machine for a food container disclosed in Korean Patent Application Publication No. 10-2009-0075582.

The packing machine 10 for a food container according to the related art includes a heating part 20 mounted on an upper cover 11, for sealing a film attached to a food container, a heating power source 30 mounted on a side surface thereof, a driving part 40 functioning as the rotation center of the upper cover 11, a bezel plate 50 mounted at the center thereof to be coupled to the food container, and a power source 60 mounted on a side cover.

The heating part 20 is configured such that a pipe heater, a PTC heater, or the like is mounted onto a heating plate 21 of aluminum so that a heating plate 21 having a wide metallic plate is entirely heated by the heat of the heater 20.

However, in the heater structure according to the related art, because the entire heating plate 21 is heated, the user may be burned. Further, because the entire heating plate 21 should be heated, energy consumption is high.

Furthermore, because the heating plate 21 is entirely heated, heating time is long and it takes long time to cool the heating plate 21.

In addition, the pipe heater, the PTC heater, the Linux plate heater or the like according to the related art requires a separate thermostat for controlling temperature, and when the upper cover 11 is manufactured of a synthetic resin, the upper cover 11 may be deformed by high temperature of the heated heating plate 21.

DISCLOSURE

Technical Problem

The present invention has been made in an effort to solve the above-mentioned problems, and provides a structure of a heater for a packing machine that can be promptly heated and cooled by replacing an existing heating plate formed of a metallic plate, can eliminate a danger of a burn, can lower energy consumption, can eliminate a necessity of a separate thermostat for controlling temperature, and can allow an upper cover to be manufactured of a synthetic resin.

Technical Solution

In accordance with an aspect of the present invention, there is provided A structure of a heater for a packing machine mounted on a packing machine, for thermally fusing a wrapping paper to a food container to seal the food container by generating heat if electric power is applied to the heater, wherein the heater comprises: a heating part for generating heat if electric power is applied to the heating part and thermally fusing the wrapping paper to the food container in a hollow closed curve shape; and a connecting part connecting the heating part to a power source, and wherein an upper or lower surface of the heating part contacts the wrapping paper to heat the wrapping paper so that the wrapping paper is thermally fused to the food container.

The heating part has wide upper and lower surfaces of which the widths are larger than the thickness thereof, and the wide upper and lower surfaces are horizontally deflected with respect to the thickness direction thereof such that the heating part forms a hollow closed curve shape, and wherein the wide upper and lower surfaces of the heating part contact the wrapping paper to heat the wrapping paper.

The heating part has a circular or polygonal cross-section.

The heating part has one or more band shapes such that opposite ends thereof contact each other to form a hollow closed curve shape, and the heights of surfaces of the heating part contacting the wrapping paper are the same at contact portions of the opposite ends of the heating part.

The connection part comprises: a coupling portion coupled to opposite ends of the heating part at an upper or lower portion of the contact portion; and a bending portion bent in a direction opposite to the heating part at the coupling portion to be connected to a power source, and the opposite ends of the heating part contact each other while being fixedly coupled to the coupling portion.

One end of the connecting part is integrally connected to one end of the heating part to extend from the one end of the heating part, and the connecting part is bent at one end of the heating part integrally connected to the connecting part and is disposed at an upper or lower portion of the heating part.

The heating part is integrally formed to form a hollow closed curve shape of which the height is the same as the height of a surface of the heating part contacting the wrapping paper, and the connecting part is integrally formed with the heating part to be bent.

The structure further comprises: a heater support member of which an upper or lower surface is coupled to be exposed to the outside and formed of an inflammable material; and an inflammable tape bonded to the heater support member while covering the heating part exposed to the outside, and the connecting part passes through the heater support member to be connected to a power source.

The structure further comprises: a heater support member of which an upper or lower surface is coupled to be exposed to the outside and formed of an inflammable material; and an inflammable tape bonded to the heater support member while covering the heating part exposed to the outside, and the bending portion passes through the heater support member to be connected to the power source, and a positioning recess into which the coupling portion is inserted is formed on one surface of the heater support member.

The structure further comprises a fixing support member coupled to an opposite surface of the heater support member, for connecting the heater support member to a packing machine to fixedly couple the heater support member, wherein the connecting part is formed of the same material as that of the heating part to emit heat to the outside if electric power is applied to the heating part, a heating prevention boss passing through the fixing support member protrudes from an opposite surface of the heater support member, and the connecting part passes through the heating prevention boss such that the connecting part is prevented from contacting the fixing support member by the heating prevention boss.

The heater is formed of a material heated by a resistance thereof.

The heating part forms a hollow closed curve shape by coupling a first heating part and a second heating part having band shapes, and the connecting part comprises a first connecting part integrally connected to the first heating part and a second connecting part integrally connected to the second heating part, and the heater comprises: a first heater part comprising the first heating part and the first connecting part; and a second heater part comprising the second heating part and the second connecting part.

The heater further comprises an insulation member disposed between the first connecting part and the second connecting part, for preventing the first connecting part and the second connecting part from contacting each other to be overheated.

The lengths and shapes of the first heating part and the second heating part are the same.

The heater comprises: a heating part having one bent band shape; a connecting part comprising a first connecting part connected to one end of the heating part and a second connecting part connected to an opposite end of the heating part; and an insulation member disposed between the first connecting part and the second connecting part, and the first connecting part and the second connecting part are prevented from contacting each other by the insulation member, the heater forms a hollow closed curve shape by the heating part and the insulation member, and the wrapping paper located under the insulation member is heated by heat generated by the heating part.

The heating part comprises: a first heating part for thermally fusing a portion of the wrapping paper to the food container; and a second heating part disposed on the same plane as the first heating part, for thermally fusing the remaining portions of the wrapping paper to the food container, and the connection part comprises: a first connecting part integrally connected to the first heating part; and a second connecting part integrally connected to the second heating part, and the first heating part and the second heating part are spaced from each other, and the wrapping paper is thermally fused to the food container by radiation heat generated at bent portions of the heating part and the connecting part at location where the first heating part and the second heating part are spaced apart from each other.

Advantageous Effects

The above-described structure of a heater for a packing machine according to the present invention has the following effects.

Because a heater has a band shape without a heating plate, the heater can be promptly heated and cooled, can eliminate a danger of a burn, and can lower energy consumption.

Furthermore, because the heater has a closed curve shape, it can thermally seal a food container in a hollow shape without a gap.

Furthermore, because the heights of opposite ends of a heating part are the same, a wrapping paper can be uniformly heated to be thermally sealed without a gap.

In addition, because the heater according to the present invention is formed of a material heated through a simple control of resistance and sealing time, a separate unit for controlling temperature is unnecessary.

Furthermore, because the heater is not mounted on an entire surface of an upper cover but is mounted only on a circumferential portion to be thermally sealed, the upper cover on which the heater is mounted can be manufactured of a synthetic resin.

Furthermore, because a heating prevention boss through which a connecting part passes is disposed between the connecting part and a fixing support member, the fixing support member formed of plastic (for example, ABS) can be prevented from being deformed when the connecting part is heated.

BEST MODE

Mode for Invention

First Embodiment

Figure 2:
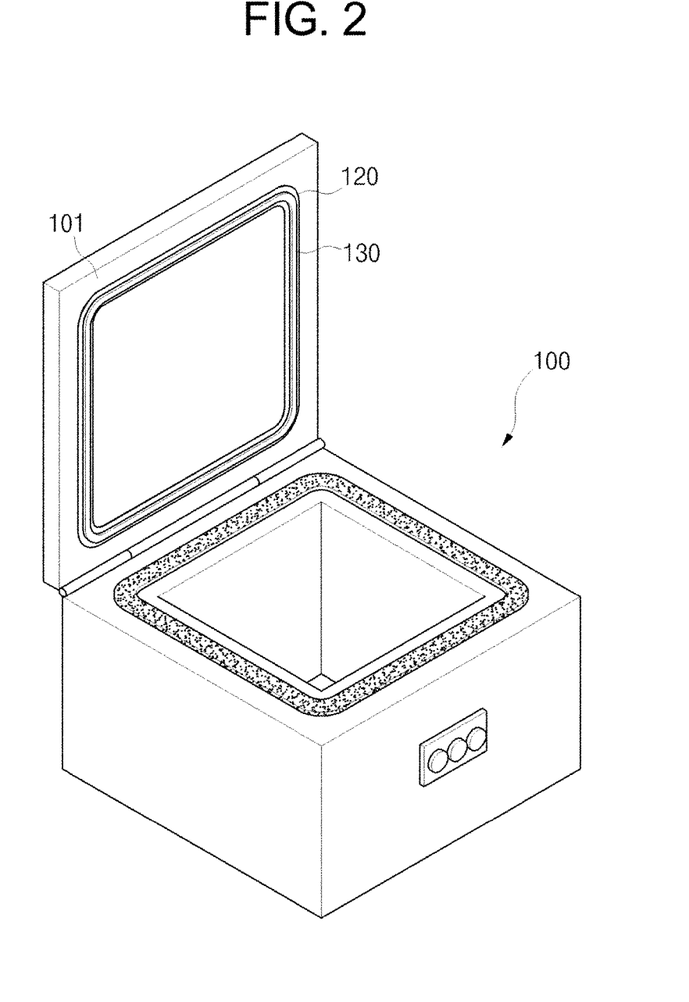
FIG. 2 is a perspective view of a packing machine on which a heater is mounted according to a first embodiment of the present invention.
Figure 3:
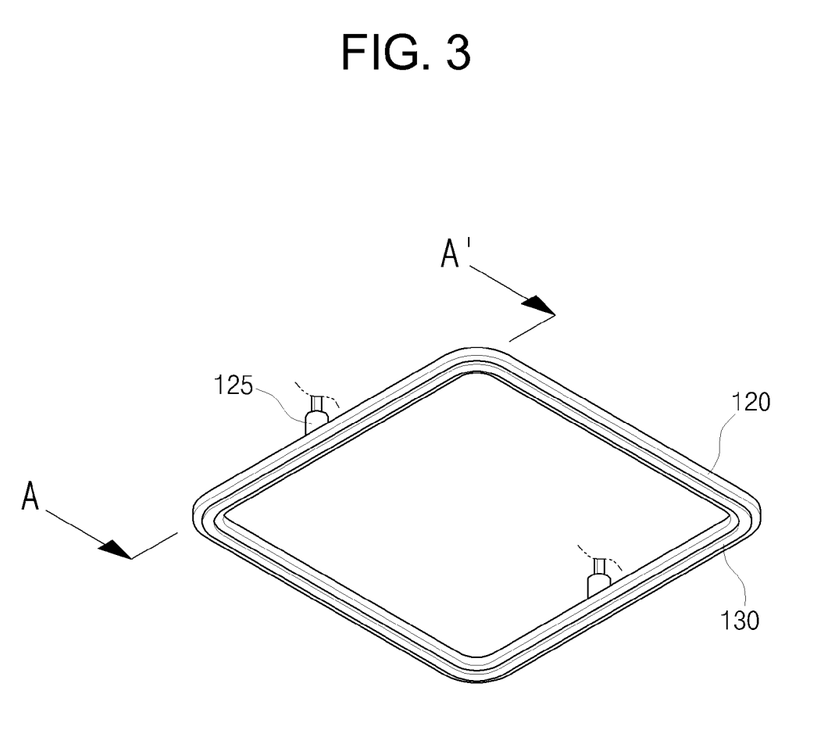
FIG. 3 is a perspective view illustrating a state in which a heater for a packing machine according to the first embodiment of the present invention is coupled to a heater support member.
Figure 4:
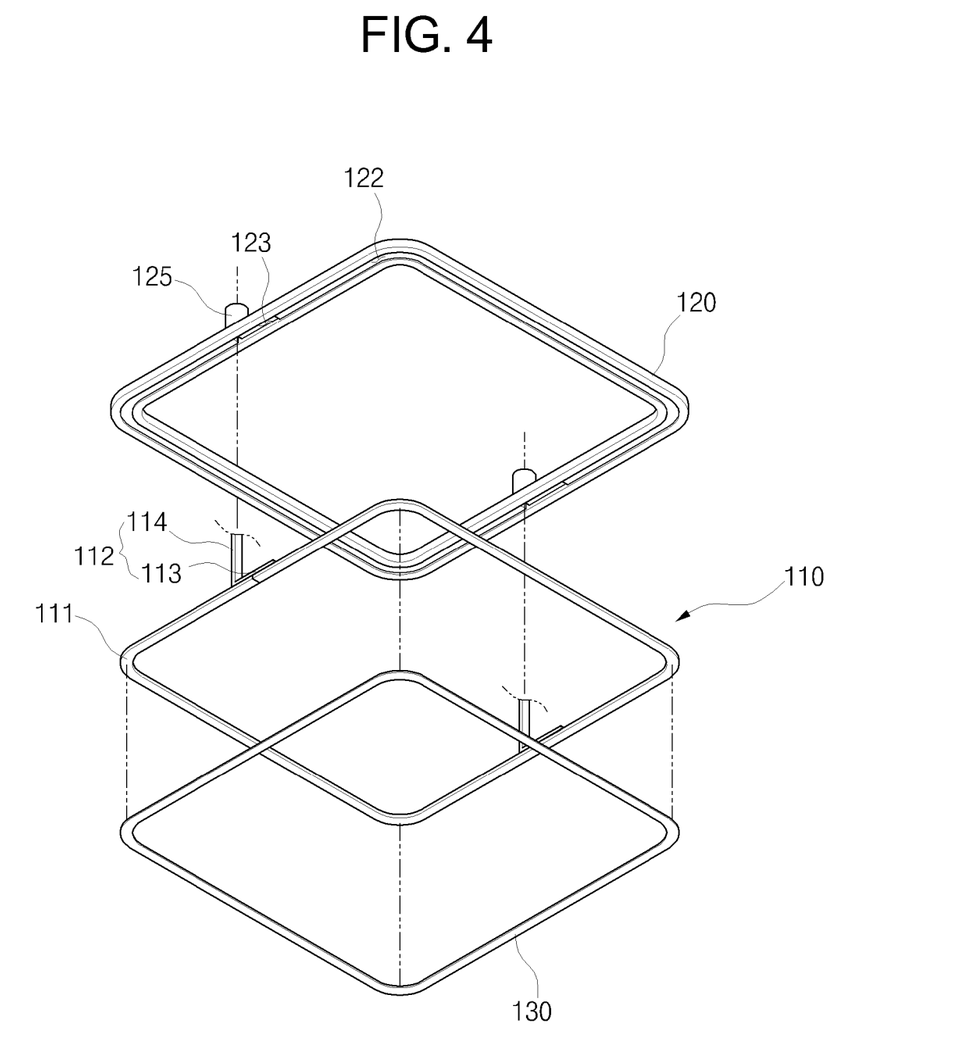
FIG. 4 is an exploded perspective view of the heater for a packing machine according to the first embodiment of the present invention and a heater support member.
Figure 5:
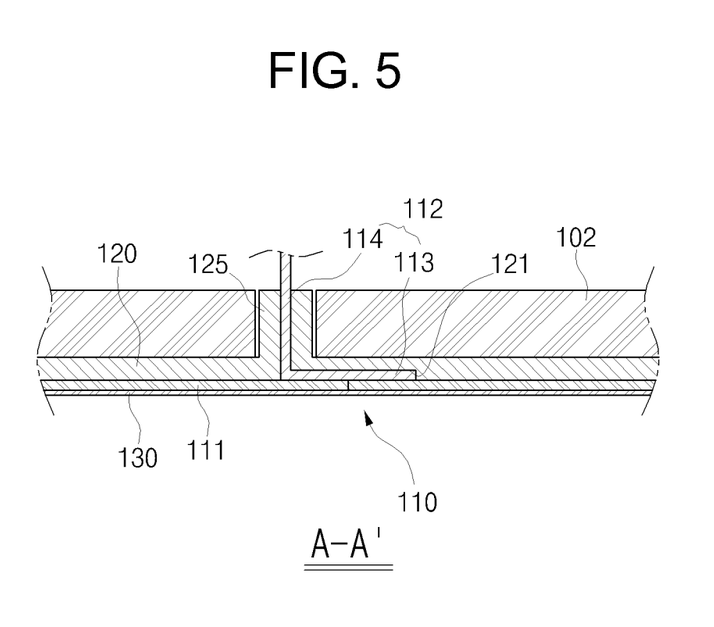
FIG. 5 is a sectional view taken along line A-A' of FIG. 3.
Figure 6:
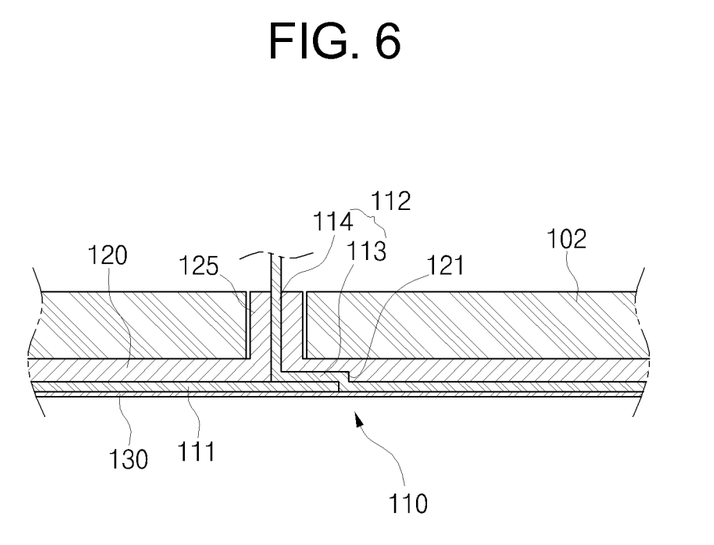
FIG. 6 is a sectional view of a heater for a packing machine according to another example of the first embodiment of the present invention.
Figure 7:
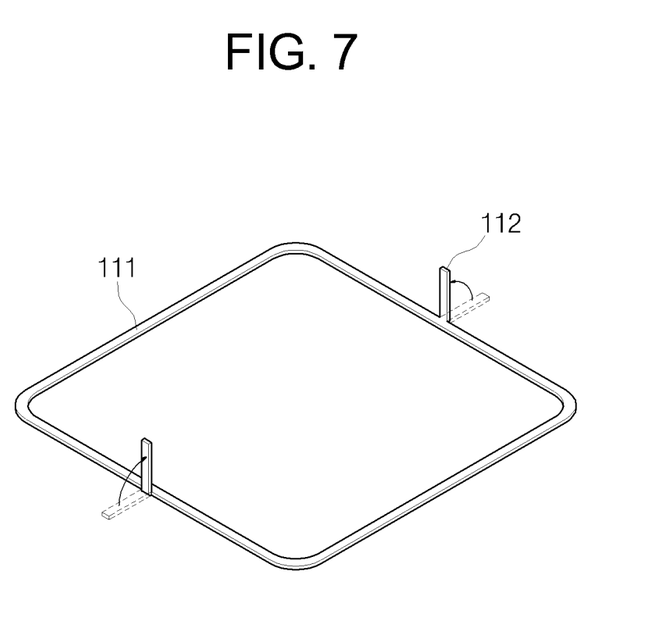
FIG. 7 is a perspective view of a heater for a packing machine according to another example of the first embodiment of the present invention.
Figure 8:
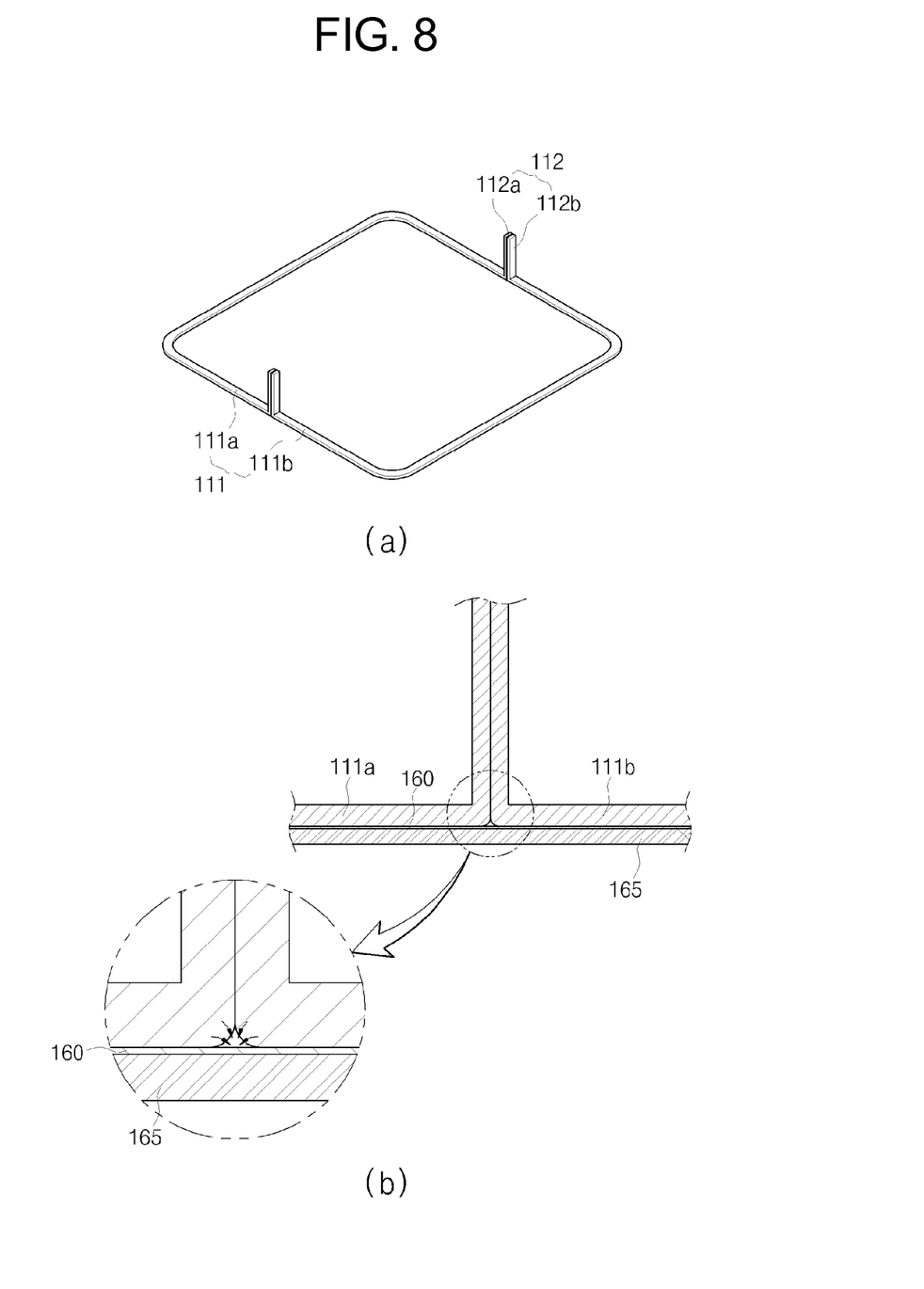
FIG. 8 is a perspective view of a heater for a packing machine according to another example of the first embodiment of the present invention.

FIG. 2 is a perspective view of a packing machine on which a heater is mounted according to a first embodiment of the present invention. FIG. 3 is a perspective view illustrating a state in which a heater for a packing machine according to the first embodiment of the present invention is coupled to a heater support member. FIG. 4 is an exploded perspective view of the heater for a packing machine according to the first embodiment of the present invention and a heater support member when the heater and the heater support member are viewed from the lower side. FIG. 5 is a sectional view taken along line A-A' of FIG. 3. FIG. 6 is a sectional view of a heater for a packing machine according to another example of the first embodiment of the present invention. FIG. 7 is a perspective view of a heater for a packing machine according to another example of the first embodiment of the present invention. FIG. 8 is a perspective view of a heater for a packing machine according to another example of the first embodiment of the present invention.

As illustrated in FIG. 2, the present invention relates to a structure of a packing machine that is mounted on a packing machine 100 to generate heat and thermally seal a wrapping paper if electric power is applied by a power source, and as illustrated in FIGS. 2 and 6, includes a heater 110, a heater support member 120, and an inflammable tape 130.

In the first embodiment of the present invention, the heater 110 is mounted on an upper cover 101 of the packing machine 100.

Although it is illustrated in FIGS. 2 and 3 that the heater 110 is hidden by the inflammable tape 130, the heater 110 includes a heating part 111 and a connecting part 112 as illustrated in FIGS. 4 and 5.

The heating part 111 has a shape that has wide upper and lower surfaces of which the width is larger than the thickness thereof, and generates heat if electric power is applied to the heater part 111.

The heating part 111 is a part that generates heat if electric power is applied to the heating part 111 to thermally fuse a wrapping paper of vinyl to a food container in a hollow closed curve shape, and the connecting part 112 is a part that connects the connecting part 111 to a power source as illustrated below.

The heating part 111 has a band shape, and has a hollow closed curve shape as the wide upper and lower surfaces thereof is deflected horizontally with respect to the thickness direction thereof.

That is, the heating part 111 is bent while the wide upper and lower surfaces thereof have the same heights horizontally.

Then, even if the heating part 111 has a slightly spaced shape instead of a perfect hollow closed curve shape, the wrapping paper may be thermally fused to a periphery of the food container in a hollow closed curve shape by radiation heat generated by the heating part 111.

Accordingly, in the present invention, the structure in which the heater 110 is formed to have a hollow closed curve shape includes a structure in which the heater 111 is slightly spaced but thermally fuses a wrapping paper to a periphery of a food container in a hollow closed curve shape, in addition to a perfect hollow closed curve shape.

The heating part 111 is mounted such that any one of the wide upper and lower surfaces is exposed to the outside so that the wrapping paper is heated and thermally sealed in a food container or the like if electric power is applied to the heating part 111 by the power source as the heating part 111 contacts the wrapping paper of vinyl while the inflammable tape 130 is interposed between the heating part 111 and the wrapping paper.

The heating part 111 has a shape having one or more bands, and as illustrated in FIGS. 3 and 4, two opposite ends of the heating part 111 contact each other to form a hollow closed curve shape.

Although it is illustrated in FIGS. 3 and 4 that one heating part 111 is bent to form a hollow closed curve shape, as illustrated in FIG. 8, the heating part 111 may be separated into two or more band shapes if necessary so that the separated band shapes are coupled to each other to form a hollow closed curve shape.

Then, as illustrated in FIG. 5, it is preferable that the heights of the surfaces of the heating part 111 contacting the wrapping paper are the same at a contact portion of the opposite ends of the heating party 111 contacting each other such that no step is present and the opposite ends of the heating part 111 are connected to each other without being ceased.

Further, it is preferable that the heating part 111 is formed of a material heated by a resistance of the heating part 111, for example, an inexpensive nichrome wire without using a separate thermostat.

The connecting part 112 functions to connect the heating part 111 to the power source.

It is preferable that the connecting part 112 is formed of an inexpensive nichrome wire like the heating part 111, and has wide upper and lower surfaces and has a thin band shape like the heating part 111.

The connecting part 111 is disposed at an upper or lower portion of the heating part 111 and is coupled to the heating part 111.

The connecting part 112 includes a coupling portion 113 and a bending portion 114.

The coupling portion 113 is coupled to the opposite ends of the heating part 111 while surface-contacting the opposite ends of the heating part 111 at an upper or lower portion of the contact portion.

Then, the coupling portion 113 is fixedly coupled to the heating part 111 through various methods such as spot welding.

The bending portion 114 is bent from the coupling portion 113 in an opposite direction of the heating part 111 to be connected to the power source.

Accordingly, the opposite ends of the heating part 111 is fixedly coupled to the coupling portion 113 to contact each other in a closed curve shape.

If necessary, the connecting part 112 may couple the opposite ends of the heating part 111 to the coupling portion 113 at a portion other than the contact portion.

Two connecting parts 112 are provided to form a positive electrode terminal and a negative electrode terminal.

Unlike the first embodiment of the present invention, as illustrated in FIG. 6, one end of the connecting part 112 may be integrally connected to one end of the heating part 111 and extend from the one end of the heating part 111.

That is, the heating part 111 and the connecting part 112 may be integrally connected to each other in a long band shape, and may be bent at one end of the heating part 111 to which the connecting part 112 is integrally connected to be disposed at an upper or lower portion of the heating part 111.

Of course, as illustrated in FIG. 6, even when the heating part 111 and the connecting part 112 are integrally connected to each other, the heating part 111 may be separated into a plurality of parts such that the plurality of parts are coupled to each other to form a closed curve shape.

As illustrated in FIG. 7, the heating part 111 may be integrally formed to form a hollow closed curve shape.

Then, the heating part 111 may be manufactured by cutting a metallic plate using a press or the like.

Furthermore, even in the heater 110 illustrated in FIG. 7, the heights of the surfaces of the heater 110 contacting a wrapping paper are made the same.

The connecting part 112 is integrally formed with the heating part 111 to be bent.

Of course, although the connecting part 112 may be manufactured separately from the heating part 111 to be coupled to the heating part 111 through welding or the like if necessary, it is preferable that, as illustrated in FIG. 7, the heating part 111 and the connecting part 112 are manufactured together through pressing or the like and the connecting part 112 is bent.

The heater support member 120 is a part to which the upper or lower surface of the heating part 111 having a wide surface on one side thereof is coupled to be exposed to the outside, and is formed of an inflammable material.

Then, the connecting part 112 passes through the heater support member 120 and is connected to the power source.

When the connecting part 112 includes the coupling portion 113 and the bending portion 114 as illustrated in FIGS. 3 to 6, the bending portion 114 passes through the heater support member 120 to be connected to the power source.

Furthermore, a positioning recess 121 into which the coupling portion 113 is inserted is formed on one surface of the heater support member 120.

In this way, because the positioning recess 121 into which the coupling portion 113 is inserted is formed on one surface of the heater support member 120, the heating part 111 can be prevented from protruding from the heater support member 120 by the thickness of the coupling portion 113 at the portion where the connecting part 112 is coupled.

Furthermore, the heater support member 120 may have a disposition recess 122 in which the heating part 111 is positioned, and then the positioning recess 121 is formed to be deeper than the disposition recess 122.

Meanwhile, as illustrated in FIG. 7, when the connecting part 112 is integrally connected to the heating part 111, the thickness of the heater 110 is not made thicker by the connecting part 112 and thus the configuration such as the positioning recess 121 is unnecessary.

Furthermore, when the connecting part 112 is formed of the same material as the heating part 111 such that heat is emitted to the outside if electric power is applied, the present invention may further include a fixing support member 102 coupled to an opposite surface of the heater support member 120, for connecting the heater support member 120 to the packing machine including an upper cover 101 to fixedly couple the heater support member 120.

The fixing support member 102 is formed of a plastic material such as ABS, and functions to couple the heater support member 120 to the upper cover 101 or the like.

Then, a heating prevention boss 125 protrudes from the opposite surface of the heater support member 120 towards the fixing support member 120, that is, in the opposite direction of the disposition direction of the heating part 111.

The heating prevention boss 125 passes through the fixing support member 102, and the connecting part 112 passes through the heating prevention boss 125.

That is, the connecting part 112 that generates heat is prevented from directly contacting the fixing support member 102 by the heating prevention boss 125.

Accordingly, the heat generated by the connecting part 112 is blocked by the heating prevention boss 125 formed of an inflammable material, and the fixing support member 102 can be prevented from being deformed by the heat generated by the connecting part 112 even when the fixing support member 102 is formed of plastic.

The inflammable tape 130 is bonded to the heater support member 120 while covering the heating part 111 exposed to the outside.

It is preferable that the inflammable tape 130 is bonded to the heater support member 120 while unceasingly covering the heating part 111.

Meanwhile, as illustrated in FIG. 8, the heating part 111 includes a first heating portion 111a and a second heating portion 111b, and the connecting part 112 includes a first connecting portion 112a and a second connecting portion 112b.

The first heating portion 111a thermally fuses a portion of the wrapping paper 160 to the food container 165.

The second heating portion 111b is disposed on the same horizontal plane as that of the first heating portion 111a, and thermally fuses the remaining portions of the wrapping paper 160 to the food container 165.

The first connecting portion 112a is integrally connected to the first heating portion 111a, and the second connecting portion 112b is integrally connected to the second heating portion 111b.

Then, the first heating portion 111a and the second heating portion 111a are minutely spaced apart from each other by a rounded bending portion as the first connecting portion 112a and the second connecting portion 112b integrally connected to each other are bent.

Accordingly, the first heating portion 111a and the second heating portion 111b are slightly spaced apart from each other at the rounded portion, that is, the bending portion of the heating part 111 and the connecting part 112, so that the first heating portion 111a and the second heating portion 111b do not form a hollow closed curve shape on the same plane.

In this structure, the wrapping paper 160 located under the location where the first heating portion 111a and the second heating portion 111b are spaced apart from each other is heated by radiation heat generated in the rounded bending portion of the first heating portion 111a and the second heating portion 111b, that is, the bending portion of the heating part 111 and the connecting part 112 and then is thermally fused to the food container 165.

Accordingly, even if the first heating portion 111a and the second heating portion 111b are slightly spaced apart from each other, the wrapping paper 160 is thermally fused to the food container 165 in a hollow closed curve shape by the heater.

Hereinafter, an assembly process of the present invention will be discussed.

First, the heating part 111 having a band shape is bent horizontally with respect to the thickness direction of the heating part 111 using a bending machine.

Then, the heating part 111 is bent such that opposite ends of the heating part 111 contact each other.

When the heating part 111 has a plurality of band shapes, the heating parts 111 are connected to each other to form a closed curve shape.

Furthermore, the two connecting parts 112 having band shapes are bent to form the coupling portions 113 and the bending portions 114.

Thereafter, the coupling portion 113 is coupled to an upper or lower surface of the heating part 111 through spot welding or the like.

Then, the coupling portion 113 is coupled to both the opposite ends of the heating part 111 while the opposite ends of the heating part 111 contact each other so that the opposite ends of the heating part 111 are connected to each other to form a hollow closed curve shape.

Furthermore, the remaining one connecting part 112 is coupled to the heating part 111 on the opposite side.

Accordingly, the two connecting parts 112 form a positive electrode terminal and a negative electrode terminal connected to the power source.

If the heater 110 is completely manufactured, the heater 110 is mounted on the heater support member 120.

Then, the connecting part 112 passes through the heater support member 120 to be mounted, and the coupling part 113 is inserted into the positioning recess 121 formed on one surface of the heater support member 120.

Accordingly, even though the coupling portion 113 is disposed between the heating part 111 and the heater support member 120, the heating part 111 can be prevented from protruding by the thickness of the coupling portion 113 because the coupling portion 113 is inserted into the positioning recess 121.

Therefore, because the height of the heating part 111 becomes the same as a whole, the heating part 111 can entirely thermally seal the circumference of the wrapping paper without a gap.

After the heater 110 is mounted on the heater support member 120, the heater 110 is covered by the inflammable tape 130.

Meanwhile, as illustrated in FIG. 7, because a metallic plate having a resistance is cut using a press or the like, the heating part 111 and the connecting part 112 having closed curve shapes are integrally cut through a pressing process to manufacture the heater 110 when the heating part 111 and the connecting part 112 are unceasingly integrally manufactured.

Because the heater 110 according to the present invention is not mounted on an entire surface of the upper cover 101 of the packing machine but is mounted only on a circumferential portion of the upper cover 101, which will be sealed, the upper cover 101 on which the heater 110 is mounted may be manufactured of a synthetic resin due to the amount of generated heat is small.

Furthermore, although it has been described that the heater 110 has a band shape having a small thickness, the heater may have a circular or polygonal shape to be mounted.

Second Embodiment

Figure 9:
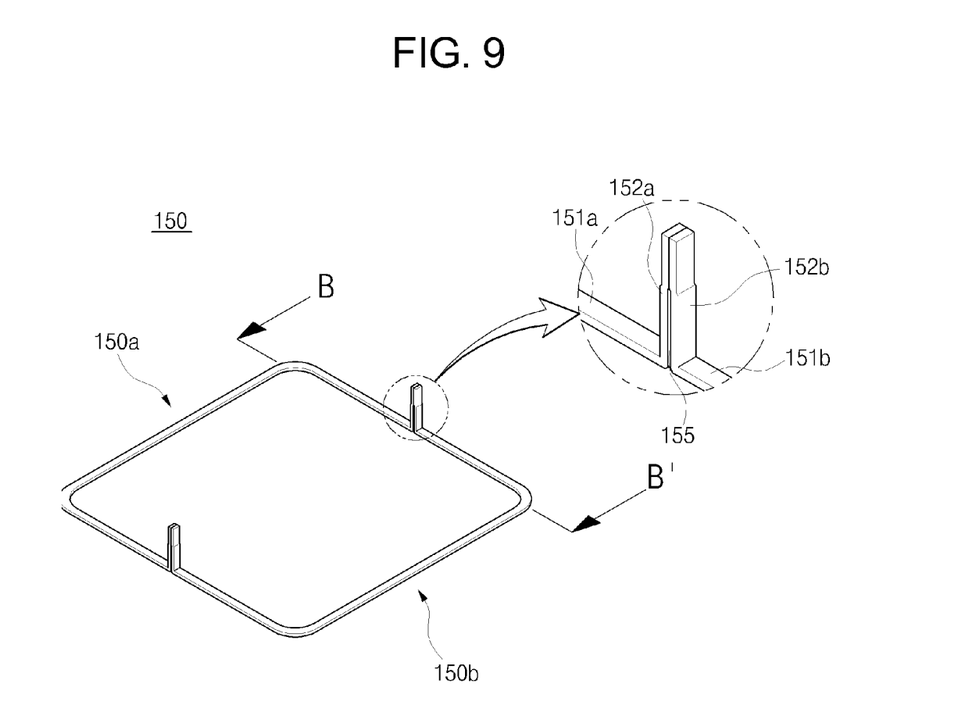
FIG. 9 is a perspective view of a heater for a packing machine according to a second embodiment of the present invention.
Figure 10:
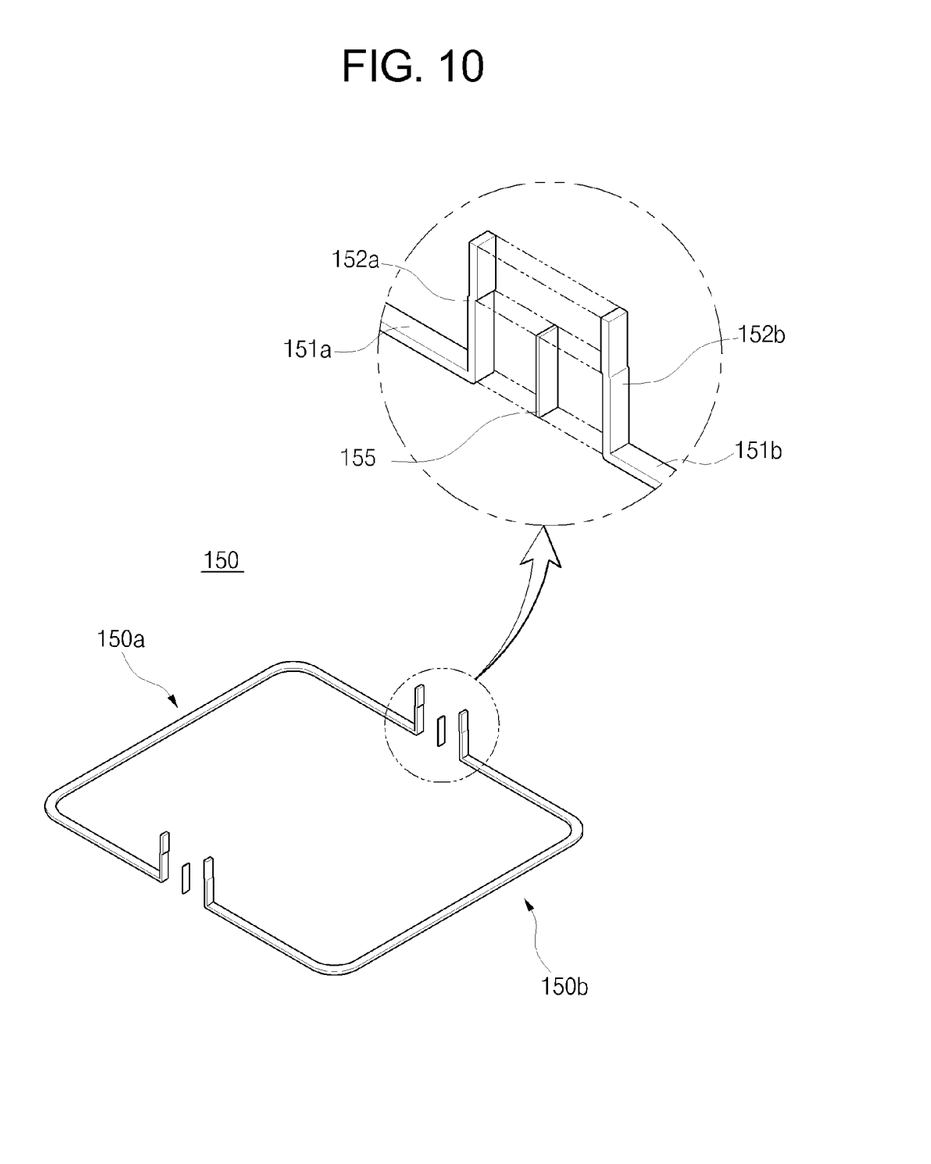
FIG. 10 is an exploded perspective view of the heater for a packing machine according to the second embodiment of the present invention.
Figure 11:
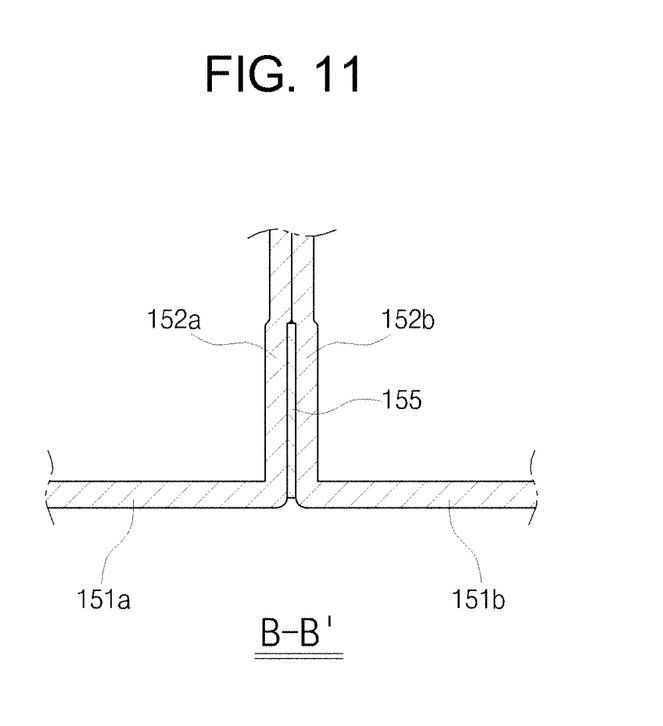
FIG. 11 is a sectional view taken along line B-B' of FIG. 8.

FIG. 9 is a perspective view of a heater for a packing machine according to a second embodiment of the present invention. FIG. 10 is an exploded perspective view of the heater for a packing machine according to the second embodiment of the present invention. FIG. 11 is a sectional view taken along line B-B of FIG. 9.

As illustrated in FIGS. 9 to 11, the heater 150 according to the present invention includes a first heater part 150a and a second heater part 150b.

The first heater part 150a includes a first heating part 151a and a first connecting part 152a, and the second heater part 150b includes a second heating part 151b and a second connecting part 152b.

The first heating part 151a and the second heating part 151b are formed by dividing the heating part and has a band shape, and the first connecting part 152a and the second heating part 152b are formed by dividing the connecting part.

The first heating part 151a and the second heating part 151b having band shapes are coupled to each other to form a hollow closed curve shape.

The first connecting portion 152a is integrally connected to the first heating portion 151a, and the second connecting portion 152b is integrally connected to the second heating portion 151b.

In the embodiment of the present invention, the first heating part 151a and the second heating part 151b have a '⊂' shape and a '⊃' shape, respectively and are stuck to each other, and two first connecting parts 152a and two second connecting parts 152b are provided to be connected to opposite ends of the first heating part 151a and the second heating part 151b, respectively.

Because the lengths and shapes of the first heater part 150a and the second heater part 150b are the same, the amounts of heat generated by the first heater part 150a and the second heater part 150b are the same when electric power is applied through the first connecting part 152a and the second connecting part 152b so that the wrapping paper may be uniformly thermally fused to the food container.

If the lengths and shapes of the first heater part 150a and the second heater part 150b are different, the amounts of heat generated by the first heater part 150a and the second heater part 150b become different, and accordingly, the wrapping paper cannot be uniformly thermally fused.

This is because the amount of heat may be different according to the length and shape of the heater 150 as the heater is formed of a material heated by the resistance thereof.

The heater 150 according to the present invention may further include an insulation member 155 disposed between the first connecting part 152a and the second connecting part 152b.

The insulation member 155 is disposed between the first connecting part 152a and the second connecting part 152b and prevents contact portions of the first connecting part 152a and the second connecting part 152b from being heated more than the remaining portions of the first connecting part 152a and the second connecting part 152b.

In more detail, because the first connecting part 152a and the second connecting part 152b are formed of a material heated by resistances thereof, respectively, the first connecting part 152a and the second connecting part 152b merge at contact portions thereof to generate a larger amount of heat than the remaining portions thereof.

If the heater is directly used, the temperatures of the contact portions of the first connecting part 152a and the second connecting part 152b become high, so that the wrapping paper cannot be thermally fused to the food container at a uniform temperature.

However, because the insulation member 155 is disposed between the first connecting part 152a and the second connecting part 152b as in the present invention, it can prevent the first connecting part 152a and the second connecting part 152b from contacting each other to prevent an increase in the amount of generated heat.

Then, although the first heating part 151a and the second heating part 151b do not directly contact the wrapping paper to heat the wrapping paper under a location where the insulation member 155 is disposed, the insulation member 155 is thin and the heat of the bending portions of the first heating part 151a and the first connecting part 152a and the second heating part 151b and the second connecting part 152b are transferred so that the wrapping paper is heated to be thermally fused to a periphery of the food container in a hollow closed curve shape.

That is, even though the first heating part 151a and the second heating part 151b do not form a perfect hollow closed curve shape, the heater 150 according to the present invention can thermally fuse the wrapping paper to a periphery of the food container in a hollow closed curve shape using radiation heat.

Of course, the first connecting part 152a and the second connecting part 152b may contact each other at a location that is distant from the first heating part 151a and the second heating part 151b.

Even in the embodiment of the present invention, the heater 150 may have a band shape, that is, a rectangular cross-section, and may have a circular or polygonal shape.

In this way, when the heater 150 includes the insulation member 155, the first heating part 151a, the insulation member 155, and the second heating part 151b are coupled to each other to form a hollow closed curve shape.

Third Embodiment

Figure 12:
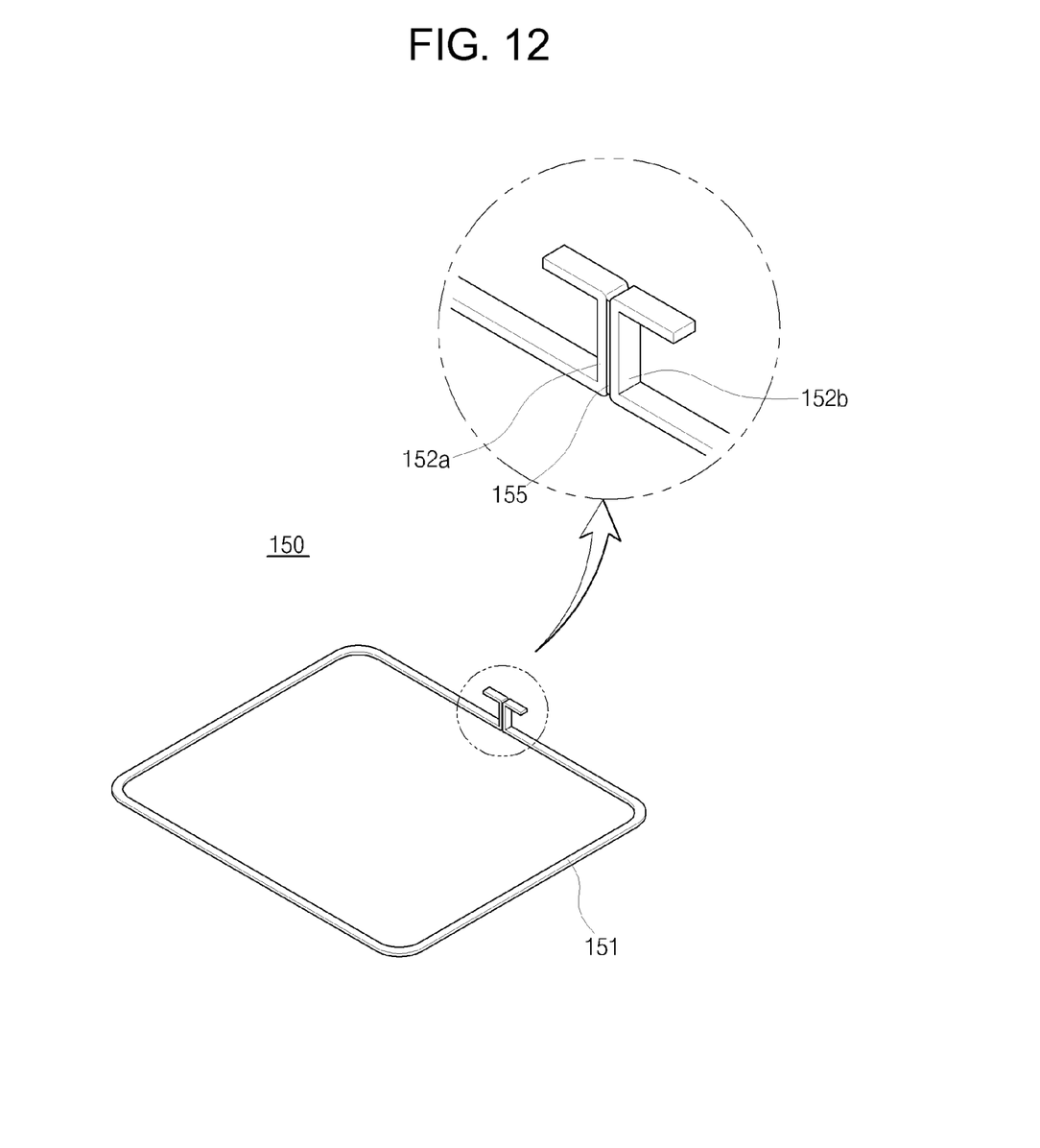
FIG. 12 is a perspective view of a heater for a packing machine according to a third embodiment of the present invention.

FIG. 12 is a perspective view of a heater for a packing machine according to a third embodiment of the present invention.

As illustrated in FIG. 12, the heater 150 of the present invention includes a heating part 151, a connecting part, and an insulation member 155.

The heating part 151 has one bent band shape.

The connecting part includes a first connecting part 152a connected to one end of the heating part 151 and a second connecting part 152b connected to an opposite end of the heating part 151.

The insulation member 155 is disposed between the first connecting part 152a and the second connecting part 152b and prevents contact portions of the first connecting part 152a and the second connecting part 152b from contacting each other.

The first connecting part 152a is connected to a positive electrode of the power source and the second connecting part 152b is connected to a negative electrode of the power source, and the first connecting part 152a and the second connecting part 152b are prevented from being short-circuited by the insulation member 155 disposed therebetween.

The heater 150 forms a hollow closed curve shape with the heating part 151 and the insulation member 155.

The wrapping paper located under the insulation member 155 does not directly contact the heating part 151 to be heated, but because the insulation member 155 is very thin, the heat generated at the opposite ends of the heating part 151 is transferred to the wrapping paper to heat the wrapping paper, so that the entire wrapping paper is uniformly thermally fused to the food container.

The other items are the same as those of the first and second embodiments of the present invention, and a detailed description thereof will be omitted.

The structure of a heater for a packing machine according to the present invention is not limited to the aforementioned embodiment, but may be variously modified without departing from the scope of the present invention.

INDUSTRIAL APPLICABILITY

The present invention can be applied to a packing machine for a food container to thermally seal a food container with a wrapping paper of vinyl.

The invention claimed is:

1. A heater for a packing machine, the heater comprising:
a heating part comprising a first heating part and a second heating part, and forming a hollow closed curve shape, wherein the heating part is configured for generating heat and thermally fusing a wrapping paper to a container in the hollow closed curve shape;
a connecting part comprising a first connecting part and a second connecting part integrally connecting with the first heating part and the second heating part, respectively,
a heater support member having an upper or a lower surface, exposed to an outside of the heater, and formed of an inflammable material;
an inflammable tape bonded to the heater support member while covering the heating part;
a fixing support member coupled to at least one of the upper and the lower surfaces of the heater support member, for connecting the heater support member to the packing machine to fixedly couple the heater support member; and
a heating prevention boss passing through the fixing support member and protruding from an opposite surface of the heater support member,
wherein an upper or a lower surface of the heating part makes contact with the wrapping paper and heats the wrapping paper,
wherein lower portions of the first and second connecting parts are respectively stepped in opposite directions to each other so as to form a space between the first and the second connecting parts, upper portions of the first and second connecting parts are in contact with each other, and an insulation member is disposed in the space between the first and the second connecting parts, and
wherein the connecting part passes through the heater support member to be connected with a power source, the connecting part is formed of the same material as that of the heating art to emit heat to the outside of the heater when electric power is supplied to the heating part, and the connecting part passes through the heating prevention boss such that the connecting part is prevented from contacting the fixing support member by the heating prevention boss.

2. The heater of claim 1,
wherein the heating part has the upper surface and the lower surface, wherein widths of each of the upper and lower surfaces are longer than a height of the heating part, and
wherein the upper and the lower surfaces of the heating part are horizontally coupled such that the heating part forms the hollow closed curve shape.

3. The heater of claim 2, wherein the heating part has a band shape such that opposite ends of the heating part make contact with each other and form the hollow closed curve shape, and heights of the upper and lower surfaces contacting the wrapping paper are the same at a contact portion of the opposite ends of the heating part.

4. The heater of claim 3, wherein the connection part comprises:
a coupling portion coupled to the opposite ends of the heating part at an upper or a lower portion of the contact portion; and
a bending portion bent in a direction opposite to the heating part at the coupling portion to be connected to a power source,
wherein the opposite ends of the heating part make contact with each other while being fixedly coupled to the coupling portion.

5. The heater of claim 4,
wherein the bending portion passes through the heater support member to be connected to the power source, and
a positioning recess into which the coupling portion is inserted is formed on one surface of the heater support member.

6. The heater of claim 3, wherein the first connecting part is bent at one end of the first heating part and the second connecting part is bent at one end of the second heating part, and wherein the first connecting part and the second connecting part are disposed at an upper or a lower portion of the heating part.

7. The heater of claim 1, wherein the heating part has a circular or a polygonal cross-section.

8. The heater of claim 1, wherein the hollow closed curve shape formed by the heating part has the same height as the height of each of the upper and the lower surfaces of the heating part contacting the wrapping paper, and wherein the connecting part is integrally formed with the heating part to be bent.

9. The heater of claim 1, wherein the heater is formed of a material heated by a resistance thereof.

10. The heater of claim 1, wherein the heating part forms the hollow closed curve shape by coupling the first heating part and the second heating part, and wherein the heater further comprises:

a first heater part comprising the first heating part and the first connecting part; and a second heater part comprising the second heating part and the second connecting part.

11. The heater of claim 10, wherein the insulation member is operable to prevent the first connecting part and the second connecting part from contacting with each other to be overheated.

12. The heater of claim 10, wherein the first heating part and the second heating part are identical in their physical dimensions.

13. A heater comprising:

a heating part having one bent-band shape;

a connecting part comprising a first connecting part connected to one end of the heating part and a second connecting part connected to an opposite end of the heating part;

an insulation member disposed between the first connecting part and the second connecting part;

a heater support member having an upper or a lower surface, exposed to an outside of the heater, and formed of an inflammable material;

an inflammable tape bonded to the heater support member while covering the heating part;

a fixing support member coupled to at least one of the upper and the lower surfaces of the heater support member, for connecting the heater support member to a packing machine to fixedly couple the heater support member; and a heating prevention boss passing through the fixing support member and protruding from an opposite surface of the heater support member, wherein the heater forms a hollow closed curve shape by coupling the heating part and the insulation member, and the wrapping paper located beneath the insulation member is heated by heat generated by the heating part, wherein upper portions of the first and second connecting parts are respectively bent in opposite directions to each other and each of heights of the first and the second connecting parts is substantially same as a height of the insulating member, and wherein the connecting part passes through the heater support member to be connected with a power source, the connecting part is formed of the same material as that of the heating art to emit heat to the outside of the heater when electric power is supplied to the heating part, and the connecting part passes through the heating prevention boss such that the connecting part is prevented from contacting the fixing support member by the heating prevention boss.

* * * * *